United States Patent [19]

Hyodo

[11] Patent Number: 5,731,651
[45] Date of Patent: Mar. 24, 1998

[54] ROTOR FOR AN ELECTROMOTIVE TOOL MOTOR

[75] Inventor: Kouki Hyodo, Anjo, Japan

[73] Assignee: Makita Corporation, Anjo, Japan

[21] Appl. No.: 651,469

[22] Filed: May 22, 1996

[30] Foreign Application Priority Data

May 24, 1995 [JP] Japan ............ 7-124987

[51] Int. Cl.$^6$ ............... H02K 9/00; H02K 5/12
[52] U.S. Cl. ............... 310/261; 310/58; 310/43; 310/270; 310/271; 310/45
[58] Field of Search ............... 310/261, 270, 310/63, 45, 58, 271, 43, 62

[56] References Cited

U.S. PATENT DOCUMENTS

| 2,593,105 | 4/1952 | Compton | 310/254 |
|---|---|---|---|
| 2,683,233 | 7/1954 | Ruhl | 310/270 |
| 2,747,119 | 5/1956 | Petersen et al. | 310/270 |
| 2,822,483 | 2/1958 | De Jean et al. | 310/45 |
| 3,151,262 | 9/1964 | Howard et al. | 310/260 |
| 3,588,560 | 6/1971 | Akselsen | 310/214 |
| 4,800,315 | 1/1989 | Schulz et al. | 310/261 |
| 5,352,948 | 10/1994 | Kim et al. | 310/214 |

FOREIGN PATENT DOCUMENTS

| 19 63 502 | 12/1967 | Germany. | |
| 26 20 917 A1 | 12/1977 | Germany. | |
| 86 25 788 U1 | 7/1988 | Germany. | |
| 3842074 | 6/1990 | Germany | 310/270 |
| 90 07 029 | 12/1991 | Germany. | |
| 653685 | 3/1979 | U.S.S.R. | 310/271 |

Primary Examiner—Thomas M. Dougherty
Assistant Examiner—B. Mullins
Attorney, Agent, or Firm—Davis and Bujold

[57] ABSTRACT

A motor rotor for use in a grinder or other electromotive tool in which a motor winding is prevented from being damaged by collisions with particles. The motor rotor is composed of a core having sixteen teeth extending radially relative to a rotation shaft and slots formed among the teeth, a coil of winding wound around the slots, and wedge members for covering the slots. Felt strip members are wound around the parts of the coil exposed at both ends of the core before the exposed parts are impregnated with varnish. Varnish also permeates the strip members, and the strip members are firmly adhered to the exposed parts of the coil. After the varnish dries, the strip members fix themselves and are provided with a strength equal to that of plastic. The ribs provided by the strip members act as fins blowing away any particles, thereby protecting the coil from damage from the particles.

14 Claims, 6 Drawing Sheets

ROTOR FOR AN ELECTROMOTIVE TOOL MOTOR

FIELD OF THE INVENTION

This invention relates to a rotor for an electromotive tool motor.

BACKGROUND OF THE INVENTION

Figure 5A:
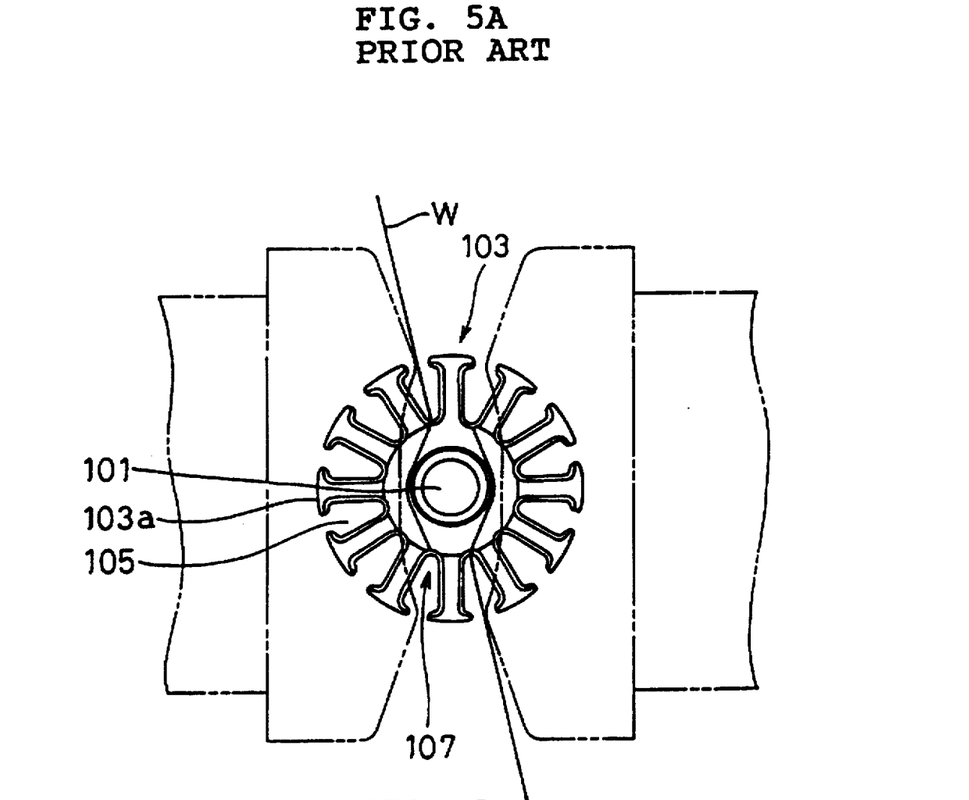
FIGS. 5A and 5B are explanatory views showing a conventional motor rotor.
Figure 5B:
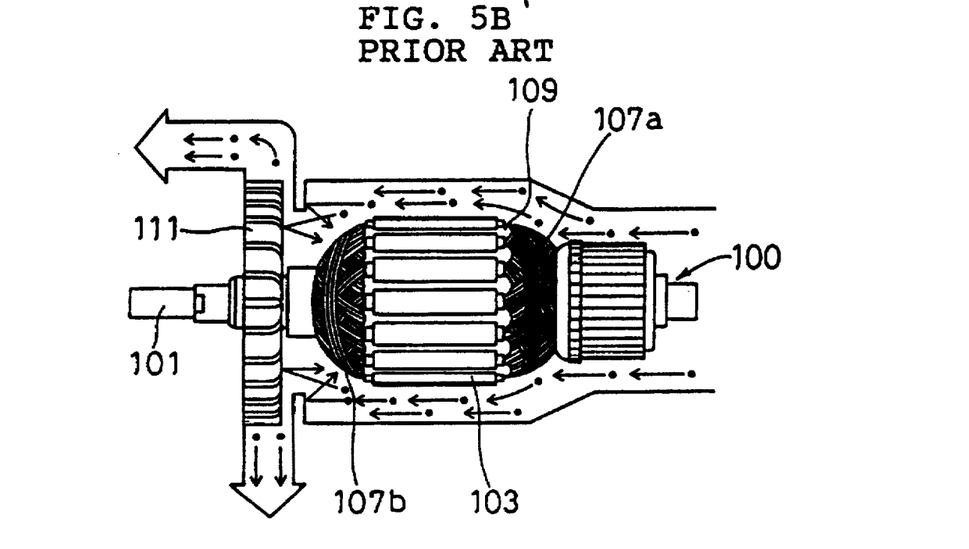

Conventionally, as shown in FIG. 5A, an electromotive tool motor rotor 100 has a rotary shaft 101, a core 103 having a plurality of teeth 103a extending radially relative to the rotary shaft 101 and slots 105 extending from one end to the other end of the core 103 between the adjacent teeth 103a, and a coil 107, wound with a wire W extending along the slots 105 from one end to the other end of the slots 105 on the periphery of the rotary shaft 101. For simplicity, FIG. 5A shows the coil 107 not yet wound with the wire W. As shown in FIG. 5B, wedges 109 are attached to cover the slots 105. Parts 107a and 107b of coil 107, exposed at the respective ends of core 103 are impregnated and coated with varnish or other resin.

As shown in FIG. 5B, the rotor 100 is attached to a grinder or other tool and is rotated at high speeds. A cooling fan 111 is attached to the rotary shaft 101, so as to form an air flow as shown by the arrows in the figure and discharge heat from the rotated rotor 100.

The air flow also transfers dust made during grinding or other operations, for example, to the wire W, thereby damaging the wire W.

SUMMARY OF THE INVENTION

Wherefore, an object of the present invention is to provide an electromotive tool motor rotor that can protect a wire from damage due to dust or other foreign objects.

To attain this or other objects, the present invention provides a rotor for an electromotive tool motor, provided with a core having a plurality of teeth extending radially relative to a rotary shaft and slots extending from one end to the other end of the core between the adjacent teeth, a coil wound from slot to slot around the rotary shaft, and wedge members covering the slots. The coil is impregnated and solidified with varnish or other resin. A ribbed strip member is formed of a sheet permeable to varnish or other resin and is composed of a plurality of ribs provided in an axial direction relative to the rotor and a strip interconnecting the ribs. The ribbed strip member is first wound around the coil parts exposed at both ends of the core and is then impregnated with the resin, such that the ribbed strip member is firmly adhered to the exposed coil parts.

In the rotor, the strip of the ribbed strip member forms an annular member wound around a periphery of the exposed coil parts closer to the core. The ribs form fins extending from the annular member in an axial direction. The annular member and the fins are firmly adhered to the exposed coil parts with impregnated resin. The ribbed strip member itself is permeable to resin. Therefore, even when the resin is applied via the ribbed strip member onto the exposed coil parts, the coil can be adhered without problem.

The fins inhibit any particles from colliding with the coil. Although the periphery of the exposed coil parts closer to the core tends to contact particles, the annular member formed on the periphery prevents any particle from directly contacting the winding of the coil. The fins and the annular member can protect the winding of the core from damage. On the other hand, since there is a clearance among the ribs of the ribbed strip member covering the surface of the exposed coil parts, heat can be discharged from such a clearance.

The ribbed strip member is preferably attached to the exposed coil parts upstream of the cooling air flow, but can also be attached downstream of the cooling air flow. As shown in FIG. 5B, the cooling fan is provided downstream of the cooling air flow. Therefore, the ribbed strip member provided at the downstream side can protect the exposed coil parts from any collision of particles sprung back from the cooling fan.

The sheet permeable to resin is preferably formed of felt. Felt is highly permeable to resin, and has sufficient strength when solidified with resin impregnated therein. Felt can bear heat of about 150 degrees centigrade, at which temperature the sheet is normally impregnated with varnish. The material of the sheet is not limited to felt, and can be any material having permeability to resin, sufficient heat resistance and sufficient strength after solidifying.

The present invention further provides a rotor for an electromotive tool motor, provided with a core having a plurality of teeth extending radially relative to a rotary shaft and slots extending from one end to the other end of the core between the adjacent teeth, a coil wound from slot to slot around the rotary shaft, and wedge members covering the slots, the coil being impregnated and solidified with varnish or other resin. In the rotor, thixotropic adhesive material is partly applied to the coil parts exposed at both ends of the core, and is then impregnated with the resin. The adhesive material retains its applied pattern even after impregnated with the resin.

In the rotor, the thixotropic adhesive material prevents the exposed coil parts from directly contacting any particle, thereby protecting the parts from any damage. The adhesive material, which is thixotropic, is raised from the surface onto which the material has been applied. Therefore, any particle can be effectively struck off.

In the rotor, the thixotropic adhesive material is applied in a zigzag pattern reciprocated between a core side and a rotary shaft side around the entire periphery of the exposed coil parts. The zigzag pattern can provide the same effectiveness as that of the ribs of the ribbed strip member. Also, in the rotor, the thixotropic adhesive material is applied once to a periphery of the exposed coil parts closer to the core, thereby forming the aforementioned annular member. Epoxy resin can be used as the heat resistant, thixotropic adhesive material.

The thixotropic adhesive material can be applied to the rotor, for example, from a nozzle. Subsequently, the rotor with the thixotropic adhesive material partly applied to the coil thereof is impregnated with varnish or an other suitable material.

The nozzle is moved at a predetermined pitch along the rotary shaft. At the same time, the rotor is rotated at a predetermined speed. Then, the aforementioned zigzag pattern can be raised on the surface of the coil. By alternately moving the nozzle along the rotary shaft and stopping it for a predetermined time, a zigzag pattern like a pulse pattern can be drawn. Furthermore, by rotating the rotor while stopping the nozzle, an annular pattern can be formed with the thixotropic adhesive material.

By the provision of the nozzle, the thixotropic adhesive material can be easily applied, thereby facilitating the entire process of manufacture. This is more advantageous or suitable for mass production than the manufacture using the ribbed strip members.

The present invention also provides a rotor for an electromotive tool motor, provided with a core having a plurality of teeth extending radially relative to a rotary shaft and slots extending from one end to the other end of the core between the adjacent teeth, a coil wound from slot to slot around the rotary shaft, and wedge members covering the slots, the coil being impregnated and solidified with varnish or other resin. In the rotor, a thread is wound on the wedge members at a small pitch such that no thread is wrapped around the rotary shaft and at a large pitch such that thread is also wrapped around the rotary shaft, the thread being impregnated with the resin such that the thread is firmly adhered to the exposed coil parts.

The thread wound and adhered to the exposed coil parts can provide the same effectiveness as that of the ribbed stripped members and the thixotropic adhesive material. The thread wound at a large pitch can serve as fins for striking off any particle or dust and protecting the coil winding from damage. The thread wound at a small pitch can cover the periphery closer to the core of the exposed coil parts.

As aforementioned, when the rotor according to the present invention is mounted onto an electromotive tool which generates particles during operation, the winding of the coil is prevented from being damaged by any particle conveyed through the air current of the cooling fan. The performance of the motor can be stabilized for a long period of time.

The objects of the present invention are easily attained for rotors having various sizes without requiring any special component. Especially, the application of the thixotropic adhesive material is advantageous for the mass production of rotors. If a coil winding machine is also used for winding the thread, mass production is feasible.

BRIEF DESCRIPTION OF THE DRAWINGS

The invention will now be described, by way of example, with reference to the drawings, in which.

DETAILED DESCRIPTION OF THE PREFERRED EMBODIMENTS

Figure 1A:
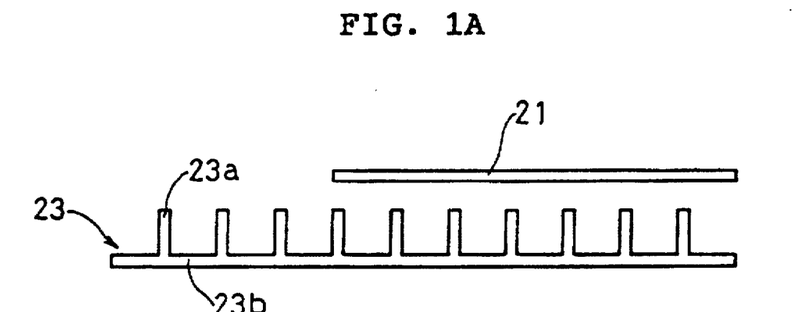
FIGS. 1A, 1B and 1C are explanatory views showing a motor rotor according to a first embodiment.
Figure 1B:
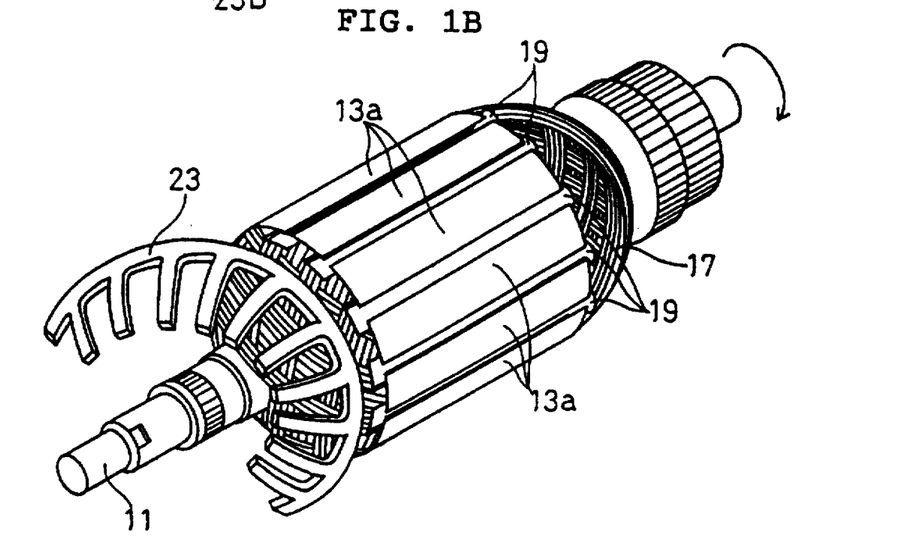
Figure 1C:
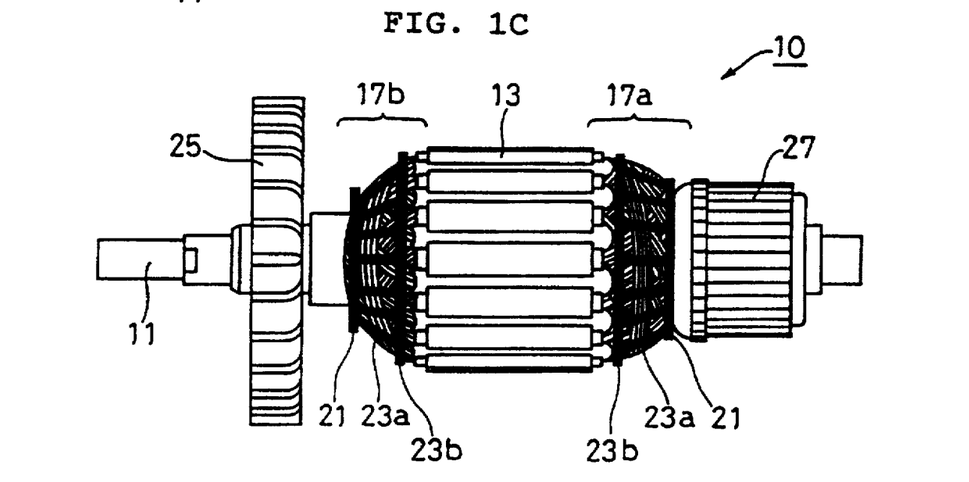

As shown in FIGS. 1B and 1C, a rotor 10 for a grinder motor or other motor in a first embodiment is composed of a core 13 having sixteen(16) teeth 13a extending radially relative to a rotary shaft 11, a coil 17 wound through slots formed between adjacent teeth 13a of core 13 around the rotary shaft 11, and wedge members 19 covering the slots, in the same manner as the conventional rotor shown in FIGS. 5A and 5B. Differently from the conventional rotor, however, felt strip members 21, 23 are wound around parts 17a and 17b of coil 17, exposed at the ends of core 13 before the parts 17a, 17b are impregnated with varnish.

The felt strip members 21, 23 are cut from a felt sheet having a thickness of about 2 mm. As shown in FIG. 1A, the strip member or ribbon 21 is shorter than the other strip member or ribbed strip member 23, which comprises a plurality of ribs 23a and a strip 23b interconnecting the ribs 23a. The strip 23b of ribbed strip member 23 has a sufficient length to wind once around the periphery of coil 17 closest to the core 13. The ribbon 21 is of a sufficient length for winding once around the periphery of the exposed parts 17a, 17b closer to the rotary shaft 11. As shown in FIG. 1B, to attach the strip members 21, 23 to the exposed parts 17a, 17b of coil 17, first the strip 23b of ribbed strip member 23 is wound around the periphery of coil 17 closest to the core 13. The ribs 23a are pushed or positioned onto the coil 17, such that the ribs 23a extend radially relative to the rotary shaft 11. The ribbon 21 is fixedly wound around the free ends of ribs 23a. An adhesive is applied to the rib members 21, 23 beforehand, and they are then preliminarily secured onto the exposed parts 17a, 17b.

Subsequently, the exposed parts 17a, 17b, provided with the strip members 21, 23, are impregnated with varnish, which permits them to firmly adhere to the coil 17. After the varnish dries, the strip members 21, 23 fix, thereby having the strength of plastic or other similar materials. In this manner, the strip members 21, 23 are secured onto the exposed parts 17a, 17b of coil 17, as shown in FIG. 1C.

In the rotor 10 of the first embodiment, the ribs 23a serve as fins for striking away dust or other particles carried by the air flow while a cooling fan 25 is rotated. The strips 23b, covering the respective edges of exposed parts 17a and 17b closer to the core 13, protect the coil 17 from any particle colliding with the coil 17. The strip members 21, 23 provided at the side of cooling fan 25 also prevent particles springing back from the cooling fan 25 from colliding with the coil 17, thereby protecting the coil 17 from damage due to impact with any particle.

In the first embodiment, the strip members 21, 23 are separate, but can be integrally formed from a unitary piece, for example, in a ladder shape. In the latter case, the preliminary attachment of the strip members onto the coil 17 is facilitated.

The following embodiments are similar to the first embodiment in structure. Therefore, like components have the same reference numerals as those in the first embodiment.

Figure 2A:
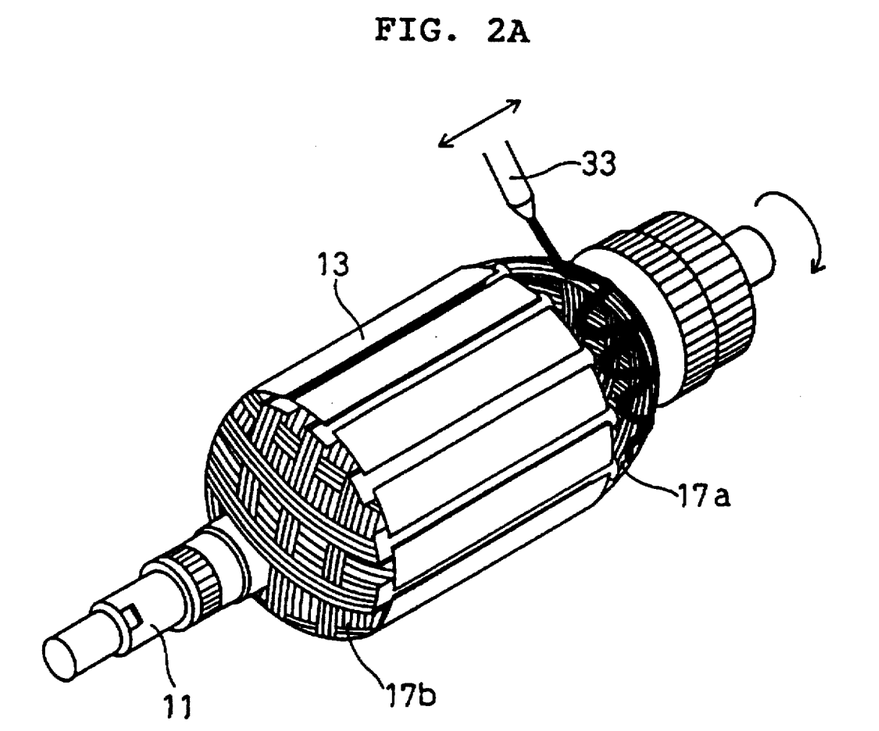
FIGS. 2A and 2B are explanatory views showing a motor rotor according to a second embodiment.
Figure 2B:
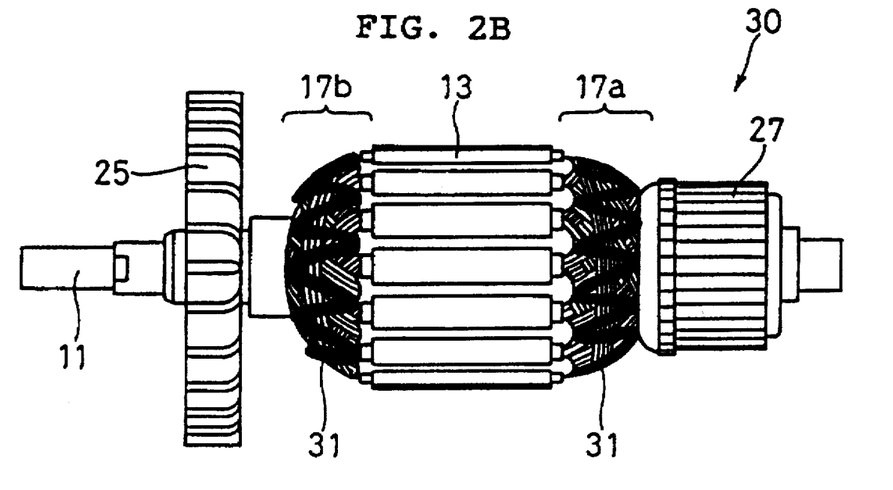

As shown in FIG. 2B, in a rotor 30 for use in a grinder motor or other motor according to the second embodiment, epoxy resin is applied to the exposed parts 17a, 17b of coil 17 in the form of a zigzag pattern 31 having a thickness of about 2 mm. The exposed parts 17a, 17b applied with the zigzag pattern 31 are subsequently impregnated with varnish.

As shown in FIG. 2A, the zigzag pattern 31 is drawn with epoxy resin discharged from a nozzle 33, by reciprocating the nozzle 33 axially relative to the rotary shaft 11 in the direction shown by the arrow, for example, on the exposed part 17a disposed between the core 13 and the rotating commutator 27, while rotating the rotary shaft 11.

The zigzag patterns 31 are thus solidified with epoxy resin onto the exposed parts 17a, 17b of coil 17. After the zigzag patterns 31 fix themselves, the exposed parts 17a, 17b are impregnated with varnish. The zigzag patterns 31 are firmly fixed on the coil 17. Epoxy resin sufficiently remains thixotropic at about 150 degrees centigrade at which temperature the exposed parts 17a, 17b are impregnated with varnish. Therefore, even after the immersion in varnish, the zigzag patterns 31 can retain their pattern and their thickness of about 2 mm. In the same manner as the first embodiment, the zigzag patterns 31 act as fins striking off any particle conveyed along the air flow from the cooling fan 25, thereby preventing the exposed parts 17a, 17b of coil 17 from being damaged by any particle.

Figure 3A:
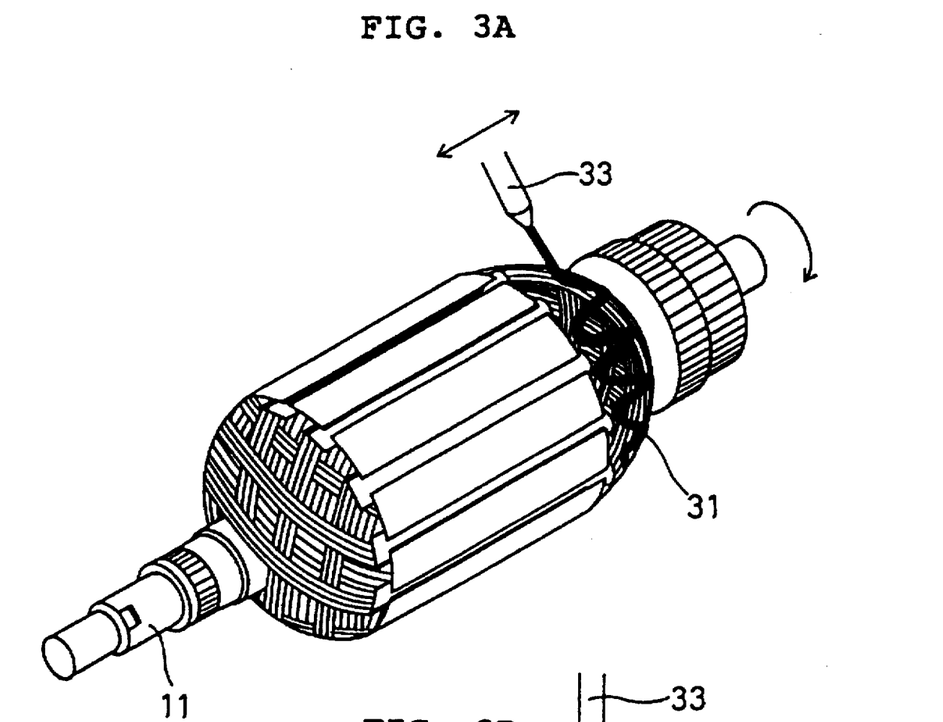
FIGS. 3A and 3B are explanatory views showing a modified motor rotor according to the second embodiment.
Figure 3B:
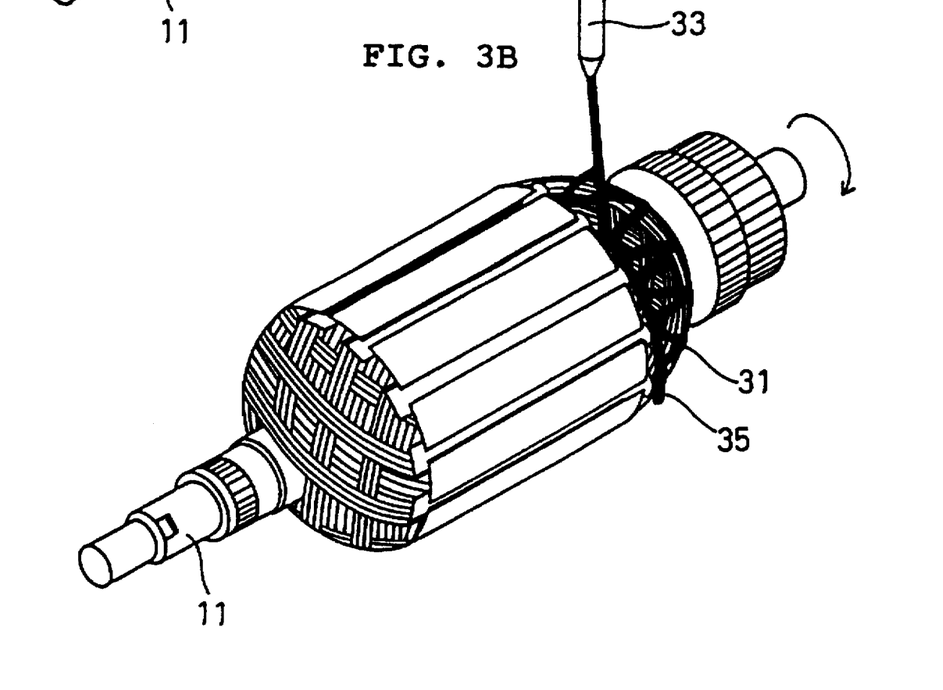

In a modification of the second embodiment, as shown in FIGS. 3A and 3B, after the zigzag pattern 31 is drawn, an annular pattern 35 can be formed by positioning the nozzle 33 above the periphery of the exposed coil parts closer to the core 13, and rotating the rotary shaft 11. The annular pattern 35 can additionally protect the coil 17 from a collision with any particle in the same way as does the rib 23b of ribbed strip member 23 according to the first embodiment.

Figure 4A:
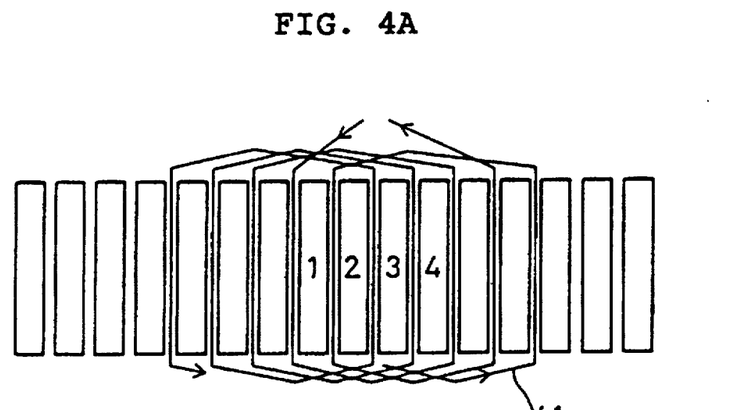
FIGS. 4A, 4B, 4C, and 4D are explanatory views showing a motor rotor according to a third embodiment.
Figure 4B:
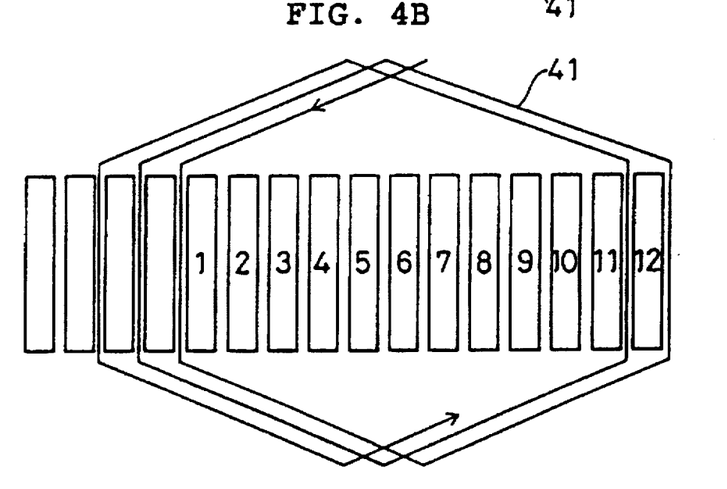
Figure 4C:
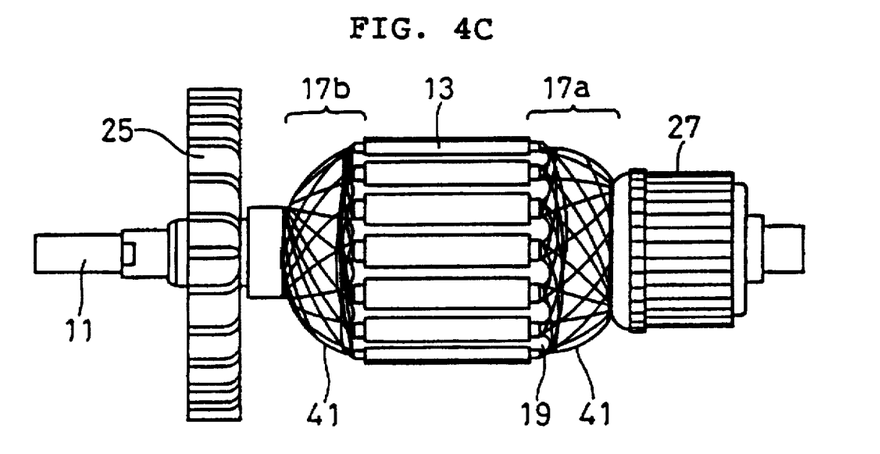
Figure 4D:
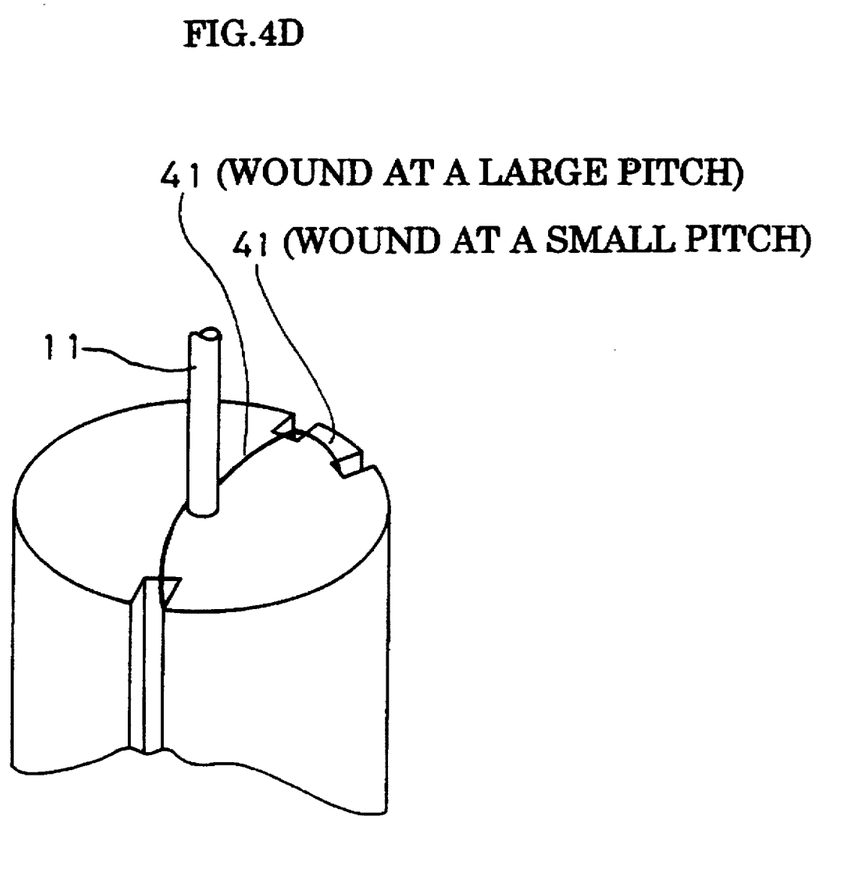

As shown in FIG. 4C, in a rotor 40, for use in a grinder motor, for example, according to the third embodiment, a linen thread 41 is wound around parts 17a, 17b, which are exposed at the ends of core 13, and the parts 17a, 17b are impregnated with varnish. The linen thread 41 and the coil 17 impregnated with varnish are integrally fixed. In FIG. 4C, the winding of coil 17 is omitted such that the linen thread 41 is clearly shown.

As shown in FIG. 4A, the linen thread 41 is first wound at a small pitch sufficient for covering the slots among four(4) teeth 13a, only over the wedge members 19, such that no linen thread 41 is wrapped around the rotary shaft 11. Subsequently, as shown in FIG. 4B, the linen thread 41 is wound at a large pitch sufficient for covering the slots among twelve(12) teeth 13a, such that the linen thread 41 is wrapped around the rotary shaft 11.

As aforementioned, the side of core 13 of exposed parts 17a, 17b of coil 17 is first densely covered with the linen thread 41 at a small pitch. As a result, the same effectiveness can be obtained as that obtained by the strip 23b of the first embodiment. The large-pitch winding of linen thread 41 is extended from respective ends of core 13 to respective ends of rotary shaft 11, thereby forming fins for blowing off any particle, in the same manner as the ribs 23a of the first embodiment and the zigzag patterns 31 of the second embodiment.

In the third embodiment, the linen thread 41 is wound over the wedge members 19. Therefore, the area for the winding of coil 17 is not reduced. The linen thread 41 can be wound using a winding machine or other similar machine. Instead of linen, any other hard and bast fibers can be used as the thread 41.

As aforementioned, in all three embodiments, the coil 17 is protected from any particle conveyed on the air flow of the cooling fan 25, and the performance of the motor can be stabilized over a long period of time.

This invention has been described above with reference to the preferred embodiment as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

What is claimed is:

1. A rotor for an electric motor, comprising:
 a) a rotary shaft;
 b) a core having a plurality of slots extending longitudinally along said rotary shaft;
 c) a coil extending along the plurality of slots of said core and having opposite end portions extending beyond said core;
 d) a material for impregnating and solidifying said coil; and
 e) a ribbed strip member formed from a pliable sheet highly permeable to said material, said ribbed strip member comprising a plurality of ribs provided in an axial direction relative to said rotor, each rib having a first end and a second end, a first strip interconnecting the first ends of said ribs, and a second strip interconnecting the second ends of said ribs;
 f) said ribbed strip member being wound around the end portions of said coil such that said first strip is closer to the periphery of said coil and said second strip is closer to the periphery of said rotary shaft, said first strip having a length substantially equal to the peripheral circumference of said coil, said second strip having a length substantially equal to the peripheral circumference of the rotary shaft, where said ribbed strip member is impregnated with said material such that said ribbed strip member is firmly adhered to said end portions of said coil.

2. A rotor as claimed in claim 1, wherein said material is one of varnish and resin.

3. A rotor as claimed in claim 1, wherein said ribbed strip member is formed of felt.

4. A rotor as claimed in claim 1, wherein said plurality of ribs, said first strip, and said second strip are formed of a one-piece unitary construction, thereby forming a ladder shape, said ribbed strip member formed of a pliable material.

5. A rotor for an electric motor, comprising:
 a) a rotary shaft;
 b) a core having a plurality of slots extending longitudinally along said rotary shaft;
 c) a coil extending along the plurality of slots of said core and having opposite end portions extending beyond said core;
 d) a thixotropic adhesive material partially applied in a desired pattern to the end portions of said coil; and
 e) a material for impregnating and solidifying said coil applied to the end portions of said coil after said thixotropic adhesive material is applied to the end portions.

6. A rotor according to claim 5, wherein said material is one of varnish and resin.

7. A rotor as claimed in claim 6, wherein said thixotropic adhesive material is applied to the end portions of said coil before being impregnated with said one of varnish and resin and retains its applied pattern even after being impregnated with said one of varnish and resin.

8. A rotor as claimed in claim 5, wherein said thixotropic adhesive material is applied to the end portions of said coil after being impregnated with said material.

9. A rotor as claimed in claim 5, wherein said thixotropic adhesive material is applied in a zigzag pattern reciprocated between a core side and a rotary shaft side around an entire periphery of said end portions of said coil.

10. A rotor as claimed in claim 9, wherein said thixotropic adhesive material is applied as at least one strip starting at a periphery of said end portions of said coil closer to said core side.

11. A rotor for an electric motor, comprising:
 a) a rotary shaft;
 b) a core having a plurality of slots extending longitudinally along said shaft;
 c) a coil extending along the plurality of slots of said core and having opposite end portions extending beyond said core;
 d) a thread wound around the end portions of said coil in a desired pattern wherein said thread is wound at a small pitch around said end portions such that said thread wound at a small pitch lies on the periphery of the exposed coil parts closer to the core, and said thread is wound at a large pitch such that a portion of said thread wound at a large pitch lies closer to said rotary shaft; and e) a material for impregnating and solidifying said coil and said thread, thereby firmly adhering said thread to said end portions of said coil.

12. A rotor according to claim 11, wherein said thread is formed of linen.

13. A rotor according to claim 11, wherein said material is one of varnish and resin.

14. A rotor according to claim 11, wherein said thread is wound at a small pitch such that the thread is not wrapped around said rotary shaft, and then said thread is wound at a large pitch such that the thread is wrapped around said rotary shaft.

* * * * *